Figure 4:
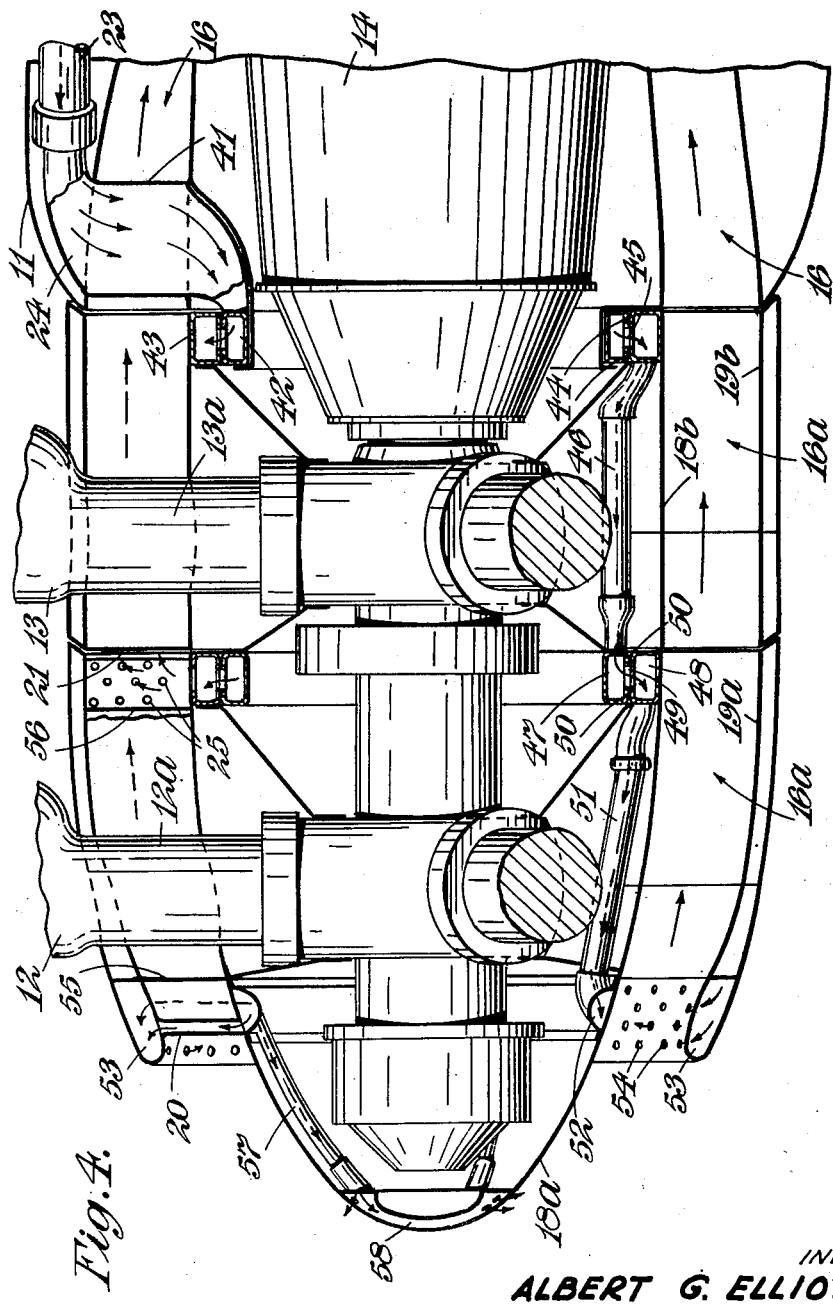

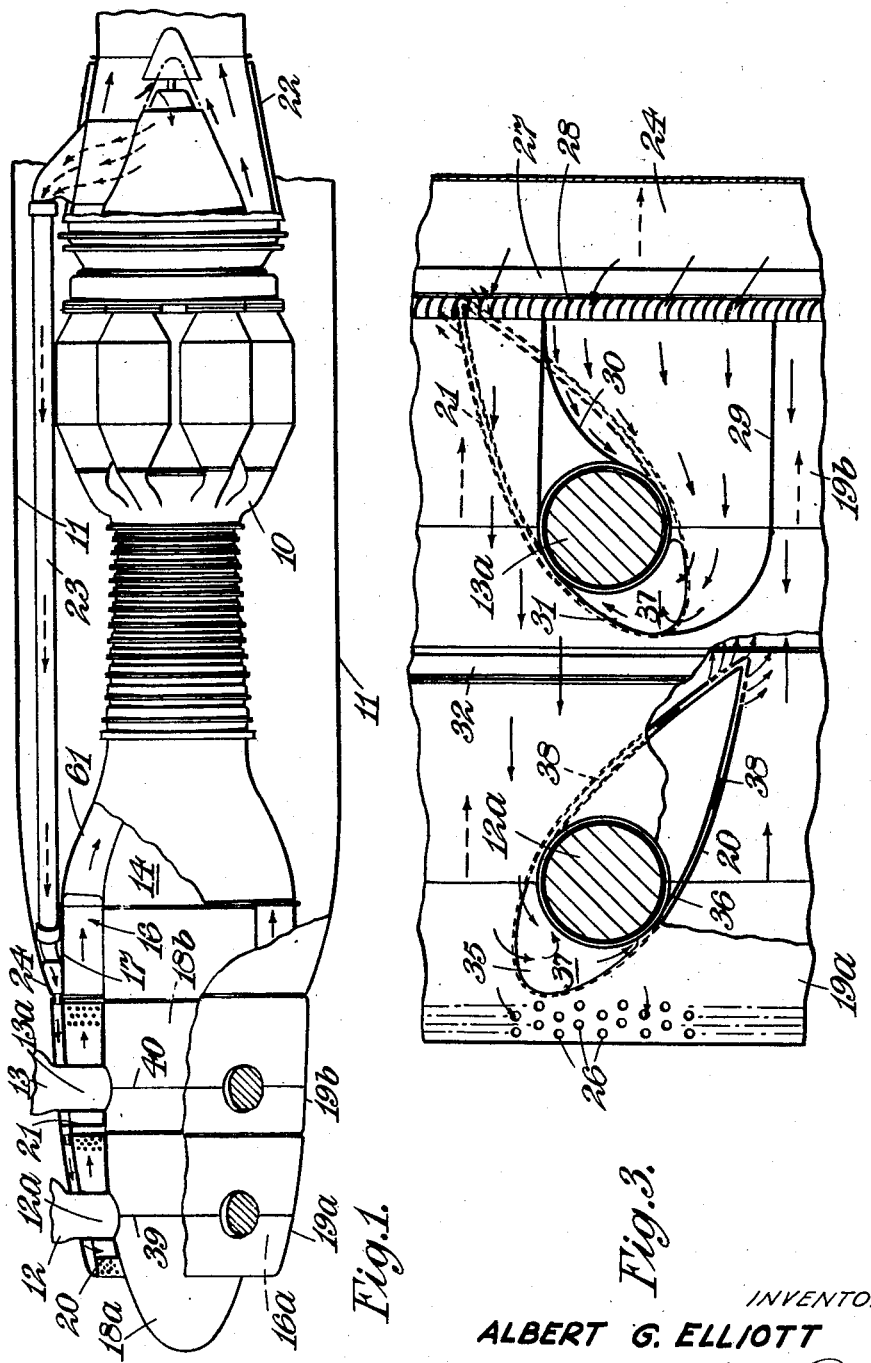

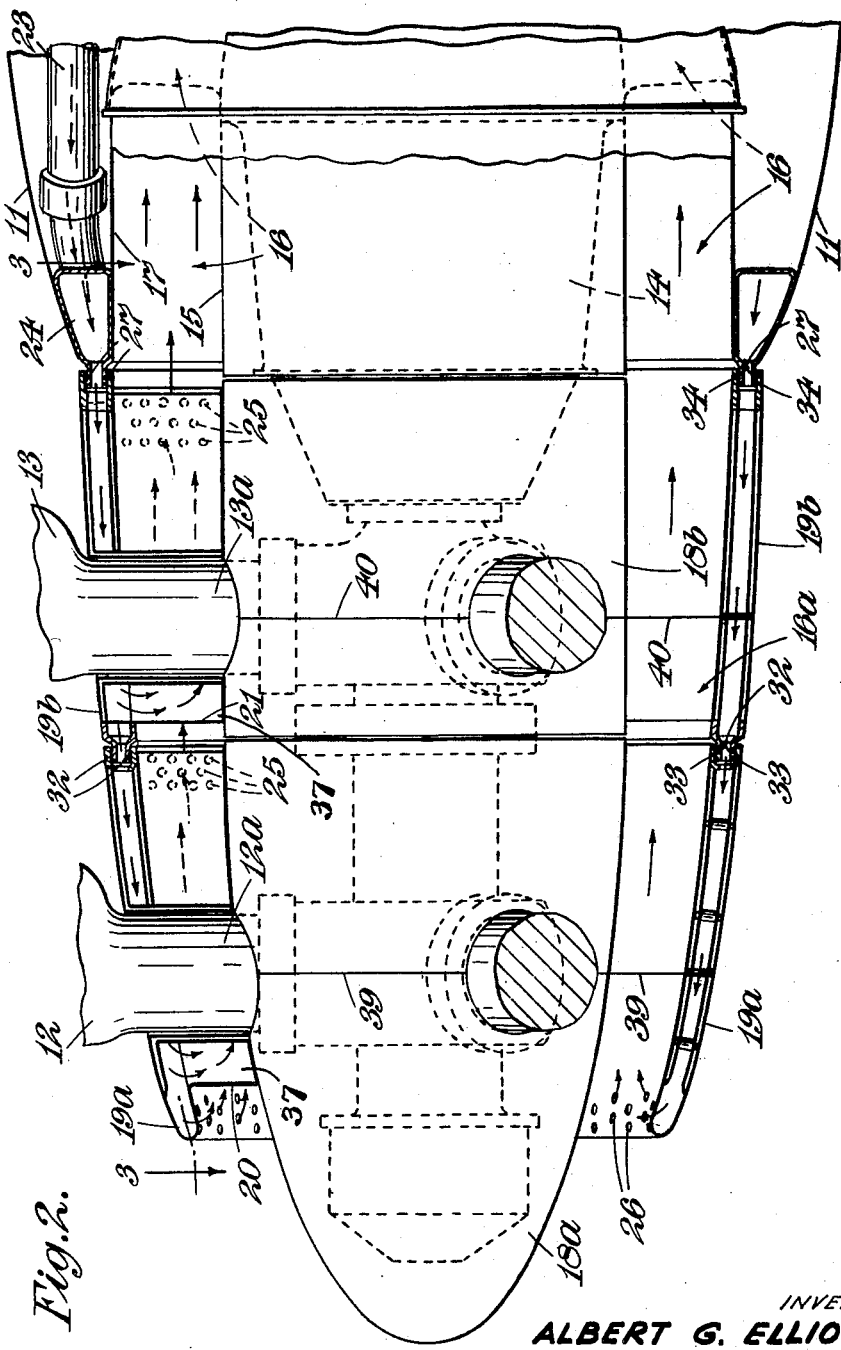

Feb. 9, 1954 A. G. ELLIOTT 2,668,596
ANTIICING AND INTAKE MEANS FOR TURBINE PROPELLER UNITS
Filed June 29, 1948 4 Sheets-Sheet 3

INVENTOR
ALBERT G. ELLIOTT
by Wilkinson Mawhinney
Attorneys

Patented Feb. 9, 1954

2,668,596

UNITED STATES PATENT OFFICE 2,668,596

ANTIICING AND INTAKE MEANS FOR TURBINE-PROPELLER UNITS

Albert George Elliott, Quarndon, England, assignor to Rotol Limited, Gloucester, England, a British company Application June 29, 1948, Serial No. 35,916

Claims priority, application Great Britain July 4, 1947

8 Claims. (Cl. 170—135.28)

This invention relates to aircraft gas-turbine-engine power plants of the type comprising an airscrew or propeller (which term includes a ducted fan) driven by the gas-turbine-engine.

Such a power plant normally comprises a compressor which delivers air to combustion equipment in which fuel is burnt and from which the combustion gases pass to a turbine to drive it. The turbine drives through a shaft or shafts the compressor and an airscrew or airscrews located either in front of the air intake duct to the compressor or towards the inlet end of the duct. In the latter case, an airscrew carries an outer annular fairing constituting with the airscrew spinner a forward, rotating extension of a stationary portion of the air intake duct.

This invention has for object to reduce the possibility of ice-formation at the inlet to the compressor, and on compressor parts.

According to this invention, a power plant of the type referred to comprises means to deliver hot gas to a structure rotating with an airscrew which structure provides a duct for the hot gas, and is formed with outlets to deliver the hot gas into the air intake duct to the compressor.

According to a feature of this invention, the hot gas is delivered to a stationary manifold located adjacent the forward end of the stationary portion of the air intake duct, through openings in this manifold to an adjacent rotating manifold which is carried by an airscrew and is then delivered from the rotating manifold through suitably located outlets into the air intake duct.

In one such arrangement, the stationary manifold is in the form of a hollow annulus and mounted at the forward end of the inner wall of the stationary portion of the air intake duct to transfer hot gas to an airscrew spinner forming a rotating continuation of such inner wall. Suitable seals are provided between the adjacent relatively rotating surfaces of the manifold and spinner. In this construction, the hot gas is preferably delivered from the rotating spinner through ducts formed in fairings enclosing the airscrew blade roots to an outer annular fairing forming a rotating extension of the outer wall of the air inlet duct and outlets are provided in the leading edge of the annular fairing to permit the hot gas to flow into the air stream passing to the compressor. Outlets may also be provided in the leading and trailing edges of the fairings enclosing the blade roots. In this manner, not only is hot gas delivered to the air inlet duct but also the leading edges of the fairings are heated so as to reduce the possibility of ice-formation thereon. Further, hot gas may also be delivered to outlets in the nose of the spinner to reduce the possibility of ice-formation thereon.

In another such arrangement, the stationary manifold is mounted at the forward end of the outer wall of the stationary portion of the air intake duct, and delivers hot gas to an outer annular fairing carried by the airscrew and forming a rotating extension of the air intake duct, suitable seals being provided between the outlet and walls. Hot gas outlets are provided in the leading edge of the outer annular fairing to deliver the hot gas into the air stream to the compressor. Hot gas may also be delivered from the annular fairing into fairings enclosing the roots of the airscrew blades from which it may pass through suitable outlets into the air stream to the compressor, and if desired into a spinner enclosing the hub of the airscrew. Here again the leading edges of the fairings are heated to reduce the possibility of ice-formation thereon.

The hot gas is conveniently abstracted from the exhaust from the turbine, for example by providing a scoop on the reaction cone of the exhaust assembly, the scoop being preferably arranged so that it may occupy operative and non-operative positions.

Where the turbine drives counter-rotating airscrews, similar transfer means for the hot gas may be provided between the airscrew as has been described above for transferring hot gas from the stationary engine structure to the rotating airscrew structure.

Figure 5:
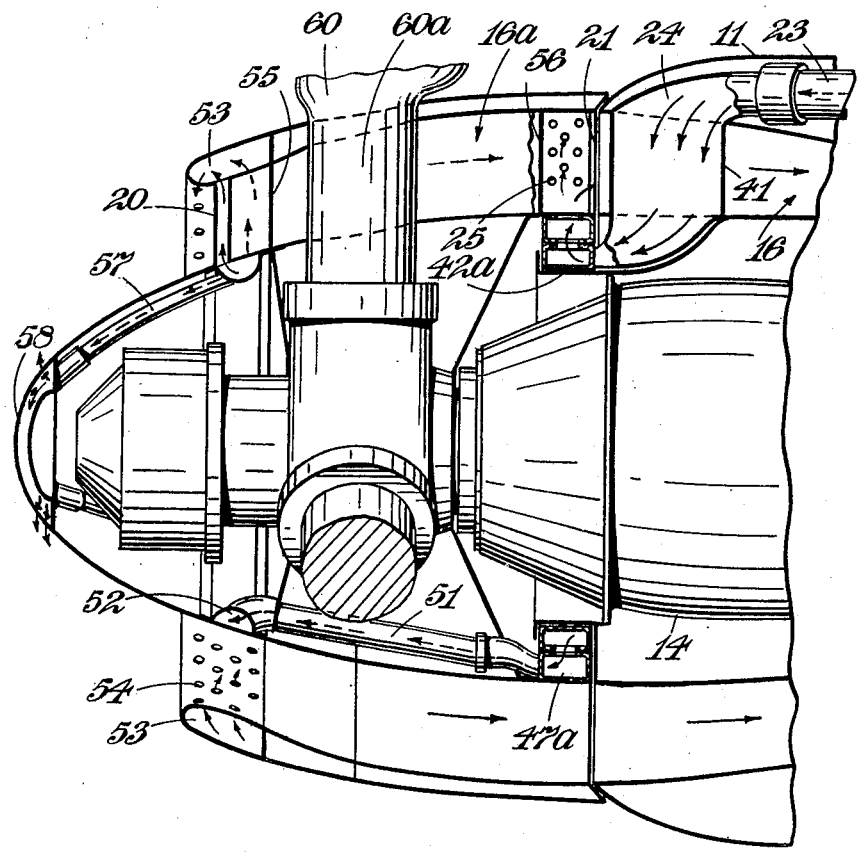

A number of embodiments of this invention will now be described by way of example, reference being made in the description to the accompanying drawings in which:

Figure 1 is a general elevation showing a gas-turbine engine driving counter-rotating airscrews, Figure 2 is an enlarged view of the left-hand end of Figure 1 showing the anti-icing arrangement in more detail, Figure 3 is a section on the line 3—3 of Figure 2, Figure 4 illustrates a modification of the anti-icing arrangements, and Figure 5 illustrates a further modification as applied to an engine driving a single airscrew.

Referring to Figure 1, there is illustrated a gas-turbine engine 10 located in a nacelle 11 and driving an airscrew or propeller of the counter-rotating type through a reduction gear 14. The sets of blades of the counter-rotating airscrew are indicated at 12, 13.

The airscrews carry respectively portions 18a, 18b of a spinner forming a continuation of the inner defining wall 15 of the air-intake 16 to the engine and also carry respectively portions 19a, 19b of a hollow outer annular fairing forming a continuation of the outer defining wall 17 of the air-intake. The space between the spinner and outer annular fairing therefore forms a rotating continuation 16a of the air-intake 16. The root portions 12a, 13a of the airscrews where they cross the space 16a are enclosed in fairings 20, 21 respectively of aerofoil section, the fairings being so inclined as to assist in delivery of air to the engine or to effect zero work on the air entering the space 16a.

To materially reduce the possibility of ice-formation on the parts forming the air-intake 16, 16a, or on the leading edges, fairings or compressor parts, hot gas is abstracted from the exhaust unit 22 of the engine 10 and delivered into the air-intake.

The hot gas may be abstracted in any convenient manner for instance the hot gas may be abstracted from the exhaust unit 22 in the manner set forth in the specification of British patent application No. 16,931/47.

The hot gas is conveyed to the forward end of the engine from the abstractor device by conduits 23 located within the nacelle 11 and is delivered to an annular manifold 24 formed in the leading edge of the nacelle 11.

In the arrangement illustrated in Figures 1 to 3, the hot gas is delivered from the manifold 24 into the outer annular fairing 19a, 19b and then into the aerofoil fairings 20, 21 from which the hot gas is fed into the air-intake 16, 16a, through outlets 25 in the trailing ends of the fairings 20, 21. Part of the hot gas is fed into the air-intake through outlets 26 in the leading end of the portion 19a of the outer annular fairing which therefore acts to distribute the hot gas to the air intake.

Referring more particularly to Figures 2 and 3, the leading edge of the nacelle 11 is formed with a pair of forwardly-directed lips 27 which enter between the rear ends of the inner and outer shells of the portion 19b of the outer annular fairing, and the hot gas is delivered to the interior of this portion through the annular gap between the lips. Gas seals 34 are formed between the lips 27 and the shells of the portion 19b to avoid excessive escape of the hot gas.

A ring of guide blades 28 is provided within the portion 19b adjacent the lips 27 to direct the hot gas forwards through the interior of the fairing and a scoop formed by partitions 29, 30 is provided to direct part of the hot gas to a port 31 through which the hot gas passes into the leading end of the aerofoil fairing 21 around the roots of the blades 13. The partitions 30 are suitably curved to enclose the blade roots 13a to protect them from the effects of the hot gas.

To deliver hot gas from the portion 19b into the portion 19a of the outer annular fairing, the leading edge of the portions 19b is formed with a pair of delivery lips 32 similar to the lips 27, suitable gas seals 33 being provided between the lips 32 and the inner and outer shells of the portion 19a. The hot gas flows forwardly through the portion 19a and then partly into the leading end of the fairings 20 around the blade roots 12a through ports 35 and partly out through the outlets 26. It will be noted that the portions 19a and 19b are rotated by the airscrews 12 and 13 and that portion 19b distributes hot gases to the three blade-root fairings 21 and to the portion 19a which distributes hot gases to the three blade-root fairings 20 and to the annular air intake duct 16. Accordingly, the portions 19a and 19b constitute rotating manifolds. A shield 36 is provided to protect the blade roots 12a from the effects of the hot gas.

The blade root fairings 20, 21 are formed along their leading edges with ducts 37 to receive the hot gases passing through the ports 31, 35 and have double skins 38 enclosing the blade-roots and extending to their trailing edges so as to confine the hot gas flow to the surfaces of the fairings.

The shells of the portions 19a, 19b are also formed as double-skinned structures, the outer skin being conveniently of aluminium and the inner skin of sheet steel, thereby avoiding excessive loss of heat and avoiding damage to the surface skin by the hot gas. The portions 19a, 19b and spinner portions 18a, 18b may, if desired, be divided into two parts along the lines 39, 40 to simplify their assembly around the blades.

The arrangement above described can be readily applied to an engine driving a single airscrew. In this case there would be a single spinner portion and a single outer annular fairing.

In the alternative arrangement illustrated in Figure 4, instead of the hot gas passing from the manifold 24 into the outer annular fairing, it is fed into the spinner portions 18a, 18b and thence into the fairing 20 and into the portion 19a of the outer annular fairing.

For this purpose, the gas leaves the manifold 24 and flows inwardly across the air-intake through fairings 41 to a fixed annular manifold 42. The manifold 42 is located beyond the leading end of the nacelle 11 and projects slightly into the rearmost portion 18b of the spinner, and this portion 18b carries within it at its rear end a rotating manifold 43 which closely surrounds the manifold 42. Suitable transfer openings 45 are provided in the abutting faces of these manifolds and gas seals 44 are formed between the edges of these faces.

The hot gas passes from the manifold 43 through transfer pipes 46 accommodated in the spinner portion 18b to a further annular manifold 47 carried by the portion 18b and projecting slightly into the spinner portion 18a, and then passes into a manifold 48, carried by the portions 18a to closely surround the manifold 47, through openings 49 in the abutting faces of these manifolds. Seals 50 are formed between the edges of the abutting faces of these manifolds.

From the manifold 48, part of the hot gas flows into the trailing edge of the fairing 20 and is delivered into the air flowing in the air-intake through the outlets 25. The remainder of the hot gas flows through transfer pipes 51 to a trough-like member 52 from which it flows partly into the leading end of the fairing 20 and then into an annular distributor chamber 53 formed in the leading edge of the portion 19a and out into the gas stream through outlets 54. The fairing 20 is provided with a pair of partitions 55, 56 which close off the leading and trailing portions of the fairing from the centre portion and the leading and trailing portions are conveniently of a double-skinned construction to confine the gas flow to the surface of the fairing.

The remainder of the hot gas from the duct 52 flows through pipes 57 into a chamber 58 formed in the nose of the portion 18a and then flows out into the air stream entering the air-intake.

The construction illustrated in Figure 5 is similar to that of Figure 4 except that the engine drives a single-rotating airscrew instead of an airscrew of the counter-rotating type. The airscrew 60 is provided with a spinner 18 and outer annular fairing 19 and fairings 20 enclose the blade roots 60a. The hot gas passes to a manifold 42a corresponding to the manifold 42 and then into a manifold 47a corresponding to the manifold 47, and is then distributed to the leading and trailing edges of the fairing 20, the leading edge of the fairing 19 and the nose of the spinner 18 in the same way as for the spinner portion 18a, the fairing 20, and outer fairing portion 19a of Figure 4.

By mixing hot gas with the air entering the compressor as above described, the air temperature is raised and the possibility of ice-formation on the parts of the engine air-intake and on the struts extending across the air-intake to support auxiliary equipment, such as struts 61 (Figure 1) supporting the reduction gear 14, is materially reduced. Furthermore the fairings are heated by the gas flowing through them thereby reducing the possibility of ice-forming on them.

I claim:

1. For use with a turbine-propeller power-plant having an engine-compressor, a turbine system connected to receive working fluid compressed by said compressor and an annular air intake duct for the compressor; the combination of a propeller means adapted to be driven by the turbine system, a spinner carried by the propeller means and defining a rotatable continuation of the inner wall of the air intake duct, an annular fairing carried by the propeller means and spaced radially outwardly from the spinner and forming a rotatable continuation of the outer wall of the air intake duct, a stationary manifold supported by the air intake duct at the inner wall thereof, means supplying hot gas to the manifold, a first rotatable manifold circumposed on the stationary manifold and carried by the spinner, means communicating said manifolds, a second rotatable manifold carried by the spinner and spaced forward of the first rotatable manifold, means extending axially of the spinner connecting the first and second rotatable manifolds, said propeller means having root portions disposed transversely between the spinner and annular fairing, means enclosing said root portions, said second rotatable manifold being positioned in advance of said root portions enclosing means and having means communicating with said root portions enclosing means and with the air intake duct.

2. For use with a turbine-propeller power-plant having an engine-compressor, a turbine system connected to receive working fluid compressed by said compressor and an annular air intake duct for the compressor; the combination of a propeller means adapted to be driven by the turbine system, a spinner carried by the propeller means and defining a rotatable continuation of the inner wall of the air intake duct, an annular fairing carried by the propeller means and spaced radially outwardly from the spinner and forming a rotatable continuation of the outer wall of the air intake duct, a stationary manifold supported by the air intake duct at the inner wall thereof, means supplying hot gas to the manifold, a first rotatable hollow annulus circumposed on the stationary manifold and carried by the spinner, means communicating said manifold and said annulus, a second rotatable hollow annulus carried by the spinner and spaced forward of the first rotatable annulus, means extending axially of the spinner connecting the first and second rotatable annulus, said propeller means having root portions disposed transversely between the spinner and annular fairing, means enclosing said root portions, said second rotatable annulus being positioned in advance of said root portions enclosing means and having means communicating with said root portions enclosing means and with the air intake duct, and means for conveying at least part of the gas from the second annulus to the interior of the leading end of the annular fairing and the spinner and means in said ends for directing the gas into the air intake duct.

3. A gas-turbine engine power-plant comprising an engine-compressor, a turbine system connected to receive working fluid compressed by said compressor, an annular air intake duct for said compressor, a propeller means connected to be driven by said turbine, mounted to rotate in front of said air-intake duct and having a set of blades with blade roots extending across said air intake duct, a stationary manifold structure, means to supply hot gas to said stationary manifold structure, a rotating manifold structure carried for rotation by said propeller means, hot gas interconnecting means between said stationary manifold structure and said rotating manifold structure, hollow fairings extending across said air intake duct and surrounding said blade roots, hot gas connections between said rotating manifold and said hollow fairings for delivering the hot gas into the leading ends of said hollow fairings, and hot gas outlets in the trailing ends of said hollow fairings, said fairings having a double wall through which the hot gas flows to said outlets.

4. A power-plant as claimed in claim 3, wherein the blade-root fairings are formed with separated ducts in their leading and trailing ends and hot gas flows through both ducts to outlets into the air-intake.

5. A power-plant as claimed in claim 3, wherein said rotating manifold structure comprises inner and outer skins, and said delivery means comprises a pair of spaced lips on said stationary manifold structure projecting between said inner and outer skins.

6. A power-plant as claimed in claim 3, wherein said propeller means comprises counter-rotating blades in tandem, the rotating manifold structure is formed in two portions respectively rotating with the sets of counter-rotating blades, and means is provided to transfer hot gas from the rearmost portion to the forward portion.

7. A power-plant as claimed in claim 6, wherein both said portions comprise inner and outer skins, and the transfer means comprises a pair of spaced lips on one portion engaging between the inner and outer skins of the other portion.

8. A power-plant as claimed in claim 3, wherein said duct has an inner stationary wall and an outer stationary wall, said propeller means has a second set of blades, the blades of the two sets rotating in opposite directions, said stationary manifold structure is formed in the leading edge of said outer wall, said rotating manifold structure forms a continuation of said outer wall and has a first portion carried for rotation by one of said sets of counter-rotating blades and a second portion carried for rotation by the other of said sets of counter-rotating blades, said hot gas interconnecting means is adapted to deliver hot gas from said stationary manifold structure to one of said portions, means are provided to deliver hot gas from said one of said portions to the other of said portions, hot gas connections are provided between said portions and said hollow fairings, and scoop means are provided in said one of said portions to guide hot gas to said hot gas connections between said one of said portions and said fairings.

ALBERT GEORGE ELLIOTT.

References Cited in the file of this patent

UNITED STATES PATENTS

| Number | Name | Date |
|---|---|---|
| 2,404,275 | Clark | July 16, 1946 |
| 2,435,990 | Weiler | Feb. 17, 1948 |
| 2,440,115 | Palmatier | Apr. 20, 1948 |
| 2,446,663 | Palmatier | Aug. 10, 1948 |
| 2,474,068 | Sammons | June 21, 1949 |
| 2,482,720 | Sammons | Sept. 20, 1949 |
| 2,503,451 | Palmatier | Apr. 11, 1950 |
| 2,507,044 | Palmatier | May 9, 1950 |
| 2,529,103 | Palmatier | Nov. 7, 1950 |
| 2,559,851 | Dean | July 10, 1951 |

FOREIGN PATENTS

| Number | Country | Date |
|---|---|---|
| 102,209 | Sweden | July 29, 1941 |
| 837,466 | France | Nov. 12, 1938 |
| 871,408 | France | Jan. 15, 1942 |